US009426142B2

United States Patent
Sureshchandra et al.

(10) Patent No.: US 9,426,142 B2
(45) Date of Patent: Aug. 23, 2016

(54) SYSTEMS AND METHODS FOR LOGGING INTO AN APPLICATION ON A SECOND DOMAIN FROM A FIRST DOMAIN IN A MULTI-TENANT DATABASE SYSTEM ENVIRONMENT

(75) Inventors: Jayesh Sureshchandra, San Francisco, CA (US); Addison Luh, Union City, CA (US)

(73) Assignee: salesforce.com, inc., San Francisco, CA (US)

( * ) Notice: Subject to any disclaimer, the term of this patent is extended or adjusted under 35 U.S.C. 154(b) by 511 days.

(21) Appl. No.: 12/981,833

(22) Filed: Dec. 30, 2010

(65) Prior Publication Data

US 2011/0302631 A1 Dec. 8, 2011

Related U.S. Application Data

(60) Provisional application No. 61/352,303, filed on Jun. 7, 2010.

(51) Int. Cl.
*H04L 29/06* (2006.01)
*G06F 21/34* (2013.01)
*G06F 21/41* (2013.01)
*G06F 21/62* (2013.01)
*G06F 17/30* (2006.01)

(52) U.S. Cl.
CPC ...... *H04L 63/0815* (2013.01); *G06F 17/30587* (2013.01); *G06F 21/34* (2013.01); *G06F 21/41* (2013.01); *G06F 21/6227* (2013.01)

(58) Field of Classification Search
CPC .... G06F 21/41; H04L 63/0815; H04L 63/102
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |

(Continued)

OTHER PUBLICATIONS

Hinton, et al. WIPO Pub. No. WO 02/39237, "Method and system for web-based cross-domain single-sign-on authentication," Published May 16, 2002.*

(Continued)

*Primary Examiner* — Robert Leung
(74) *Attorney, Agent, or Firm* — Ingrassia Fisher & Lorenz, P.C.

(57) ABSTRACT

A system and method for logging into an application across separate domains in a multi-tenant database environment is provided. The method may include receiving, by a server associated with a first domain, a substitute user request from a user of the first domain, the substitute user request including a request for the user of the first domain to become a user on a second domain, posting, to a server associated with the second domain, the substitute user request, and posting, by the server associated with the second domain, a new session identification allowing the user of the first domain to login to an application on the second domain.

12 Claims, 3 Drawing Sheets

(56) References Cited

U.S. PATENT DOCUMENTS

| | | | |
|---|---|---|---|
| 6,055,637 A * | 4/2000 | Hudson et al. | 726/20 |
| 6,092,083 A | 7/2000 | Brodersen et al. | |
| 6,169,534 B1 | 1/2001 | Raffel et al. | |
| 6,178,425 B1 | 1/2001 | Brodersen et al. | |
| 6,189,011 B1 | 2/2001 | Lim et al. | |
| 6,216,135 B1 | 4/2001 | Brodersen et al. | |
| 6,233,617 B1 | 5/2001 | Rothwein et al. | |
| 6,266,669 B1 | 7/2001 | Brodersen et al. | |
| 6,295,530 B1 | 9/2001 | Ritchie et al. | |
| 6,324,568 B1 | 11/2001 | Diec et al. | |
| 6,324,693 B1 | 11/2001 | Brodersen et al. | |
| 6,336,137 B1 | 1/2002 | Lee et al. | |
| D454,139 S | 3/2002 | Feldcamp et al. | |
| 6,367,077 B1 | 4/2002 | Brodersen et al. | |
| 6,393,605 B1 | 5/2002 | Loomans | |
| 6,405,220 B1 | 6/2002 | Brodersen et al. | |
| 6,434,550 B1 | 8/2002 | Warner et al. | |
| 6,446,089 B1 | 9/2002 | Brodersen et al. | |
| 6,535,909 B1 | 3/2003 | Rust | |
| 6,549,908 B1 | 4/2003 | Loomans | |
| 6,553,563 B2 | 4/2003 | Ambrose et al. | |
| 6,560,461 B1 | 5/2003 | Fomukong et al. | |
| 6,574,635 B2 | 6/2003 | Stauber et al. | |
| 6,577,726 B1 | 6/2003 | Huang et al. | |
| 6,601,087 B1 | 7/2003 | Zhu et al. | |
| 6,604,117 B2 | 8/2003 | Lim et al. | |
| 6,604,128 B2 | 8/2003 | Diec | |
| 6,609,150 B2 | 8/2003 | Lee et al. | |
| 6,621,834 B1 | 9/2003 | Scherpbier et al. | |
| 6,654,032 B1 | 11/2003 | Zhu et al. | |
| 6,665,648 B2 | 12/2003 | Brodersen et al. | |
| 6,665,655 B1 | 12/2003 | Warner et al. | |
| 6,684,438 B2 | 2/2004 | Brodersen et al. | |
| 6,711,565 B1 | 3/2004 | Subramaniam et al. | |
| 6,724,399 B1 | 4/2004 | Katchour et al. | |
| 6,728,702 B1 | 4/2004 | Subramaniam et al. | |
| 6,728,960 B1 | 4/2004 | Loomans et al. | |
| 6,732,095 B1 | 5/2004 | Warshavsky et al. | |
| 6,732,100 B1 | 5/2004 | Brodersen et al. | |
| 6,732,111 B2 | 5/2004 | Brodersen et al. | |
| 6,754,681 B2 | 6/2004 | Brodersen et al. | |
| 6,763,351 B1 | 7/2004 | Subramaniam et al. | |
| 6,763,501 B1 | 7/2004 | Zhu et al. | |
| 6,768,904 B2 | 7/2004 | Kim | |
| 6,782,383 B2 | 8/2004 | Subramaniam et al. | |
| 6,804,330 B1 | 10/2004 | Jones et al. | |
| 6,826,565 B2 | 11/2004 | Ritchie et al. | |
| 6,826,582 B1 | 11/2004 | Chatterjee et al. | |
| 6,826,745 B2 | 11/2004 | Coker et al. | |
| 6,829,655 B1 | 12/2004 | Huang et al. | |
| 6,842,748 B1 | 1/2005 | Warner et al. | |
| 6,850,895 B2 | 2/2005 | Brodersen et al. | |
| 6,850,949 B2 | 2/2005 | Warner et al. | |
| 6,973,671 B1 * | 12/2005 | Hsing et al. | 726/8 |
| 7,010,600 B1 * | 3/2006 | Prasad et al. | 709/225 |
| 7,093,019 B1 * | 8/2006 | Bertani et al. | 709/229 |
| 7,188,181 B1 * | 3/2007 | Squier et al. | 709/228 |
| 7,340,411 B2 | 3/2008 | Cook | |
| 7,620,655 B2 | 11/2009 | Larsson et al. | |
| 7,698,160 B2 | 4/2010 | Beaven et al. | |
| 8,082,301 B2 | 12/2011 | Ahlgren et al. | |
| 8,095,413 B1 | 1/2012 | Beaven | |
| 8,095,594 B2 | 1/2012 | Beaven et al. | |
| 8,275,836 B2 | 9/2012 | Beaven et al. | |
| 2001/0044791 A1 | 11/2001 | Richter et al. | |
| 2002/0072951 A1 | 6/2002 | Lee et al. | |
| 2002/0082892 A1 | 6/2002 | Raffel | |
| 2002/0112155 A1 * | 8/2002 | Martherus et al. | 713/155 |
| 2002/0129352 A1 | 9/2002 | Brodersen et al. | |
| 2002/0140731 A1 | 10/2002 | Subramaniam et al. | |
| 2002/0143997 A1 | 10/2002 | Huang et al. | |
| 2002/0162090 A1 | 10/2002 | Parnell et al. | |
| 2002/0165742 A1 | 11/2002 | Robbins | |
| 2003/0004971 A1 | 1/2003 | Gong | |
| 2003/0018705 A1 | 1/2003 | Chen et al. | |
| 2003/0018830 A1 | 1/2003 | Chen et al. | |
| 2003/0066031 A1 | 4/2003 | Laane et al. | |
| 2003/0066032 A1 | 4/2003 | Ramachandran et al. | |
| 2003/0069936 A1 | 4/2003 | Warner et al. | |
| 2003/0070000 A1 | 4/2003 | Coker et al. | |
| 2003/0070004 A1 | 4/2003 | Mukundan et al. | |
| 2003/0070005 A1 | 4/2003 | Mukundan et al. | |
| 2003/0074418 A1 | 4/2003 | Coker et al. | |
| 2003/0120675 A1 | 6/2003 | Stauber et al. | |
| 2003/0151633 A1 | 8/2003 | George et al. | |
| 2003/0159136 A1 | 8/2003 | Huang et al. | |
| 2003/0187921 A1 | 10/2003 | Diec et al. | |
| 2003/0189600 A1 | 10/2003 | Gune et al. | |
| 2003/0204427 A1 | 10/2003 | Gune et al. | |
| 2003/0206192 A1 | 11/2003 | Chen et al. | |
| 2003/0225730 A1 | 12/2003 | Warner et al. | |
| 2003/0233404 A1 | 12/2003 | Hopkins | |
| 2004/0001092 A1 | 1/2004 | Rothwein et al. | |
| 2004/0010489 A1 | 1/2004 | Rio et al. | |
| 2004/0015981 A1 | 1/2004 | Coker et al. | |
| 2004/0027388 A1 | 2/2004 | Berg et al. | |
| 2004/0088543 A1 * | 5/2004 | Garg et al. | 713/157 |
| 2004/0117489 A1 * | 6/2004 | Harmon et al. | 709/229 |
| 2004/0128001 A1 | 7/2004 | Levin et al. | |
| 2004/0186860 A1 | 9/2004 | Lee et al. | |
| 2004/0193510 A1 | 9/2004 | Catahan et al. | |
| 2004/0199489 A1 | 10/2004 | Barnes-Leon et al. | |
| 2004/0199536 A1 | 10/2004 | Barnes Leon et al. | |
| 2004/0199543 A1 | 10/2004 | Braud et al. | |
| 2004/0210909 A1 | 10/2004 | Dominguez, Jr. et al. | |
| 2004/0249854 A1 | 12/2004 | Barnes-Leon et al. | |
| 2004/0260534 A1 | 12/2004 | Pak et al. | |
| 2004/0260659 A1 | 12/2004 | Chan et al. | |
| 2004/0268299 A1 | 12/2004 | Lei et al. | |
| 2005/0050555 A1 | 3/2005 | Exley et al. | |
| 2005/0065925 A1 | 3/2005 | Weissman et al. | |
| 2005/0091098 A1 | 4/2005 | Brodersen et al. | |
| 2005/0204148 A1 * | 9/2005 | Mayo et al. | 713/185 |
| 2005/0223022 A1 | 10/2005 | Weissman et al. | |
| 2005/0283478 A1 | 12/2005 | Choi et al. | |
| 2006/0206834 A1 | 9/2006 | Fisher et al. | |
| 2007/0016793 A1 * | 1/2007 | Insko | 713/182 |
| 2010/0125612 A1 * | 5/2010 | Amradkar et al. | 707/802 |

OTHER PUBLICATIONS

Multitenancy. (2014, Jun. 10). In Wikipedia, The Free Encyclopedia. Retrieved 21:48, Jun. 10, 2014, from http://en.wikipedia.org/w/index.php?title=Multitenancy&oldid=612356523.*

* cited by examiner

SYSTEMS AND METHODS FOR LOGGING INTO AN APPLICATION ON A SECOND DOMAIN FROM A FIRST DOMAIN IN A MULTI-TENANT DATABASE SYSTEM ENVIRONMENT

CROSS-REFERENCE TO RELATED APPLICATION(S)

This application claims the benefit of U.S. provisional patent application Ser. No. 61/352,303, filed Jun. 7, 2010, the entire content of which is incorporated by reference herein.

TECHNICAL FIELD

The following relates to data processing systems and processes, and more particularly relates to systems and processes for logging into an application on a second domain from a first domain.

BACKGROUND

Modern software development is evolving away from the client-server model toward "cloud"-based processing systems that provide access to data and services via the Internet or other networks. In contrast to prior systems that hosted networked applications on dedicated server hardware, the cloud computing model allows applications to be provided over the network "as a service" supplied by an infrastructure provider. The infrastructure provider typically abstracts the underlying hardware and other resources used to deliver a customer-developed application so that the customer no longer needs to operate and support dedicated server hardware. The cloud computing model can often provide substantial cost savings to the customer over the life of the application because the customer no longer needs to provide dedicated network infrastructure, electrical and temperature controls, physical security and other logistics in support of dedicated server hardware.

Although multi-tenant platforms can provide substantial benefits, they can be relatively difficult to design and develop. The often competing demands of integration and isolation between tenants, for example, can lead to any number of challenges in design and implementation. For example, even though multiple tenants share a common server, each tenant may be able to provide data or services to its customers using the tenant's own separate, unique network domain. Due to the nature of many network communications protocols (e.g., hypertext transport protocol (HTTP)), it can be difficult, in practice, for an administrator or other approved user to switch between different domains hosted by a common server for administrative tasks, troubleshooting or other purposes.

DESCRIPTION OF THE DRAWING FIGURES

Exemplary embodiments will hereinafter be described in conjunction with the following drawing figures, wherein like numerals denote like elements, and FIG. 1 is a block diagram of an exemplary multi-tenant data processing system;

DETAILED DESCRIPTION

According to various exemplary embodiments, systems and methods are provided to allow a user of a first domain to login to an application on a second domain in a multi-tenant database environment. If an administrator is attempting to become another user on the same domain, the administrator may acquire a session identification in a cookie allowing the administrator to become the other user. However, cookies can not be shared between domains. Accordingly, in one exemplary embodiment, a server associated with a first domain prepares a substitute user request which is sent to a second domain to allow the administrator to login to an application on a second domain, as discussed in further detail below.

Figure 1:
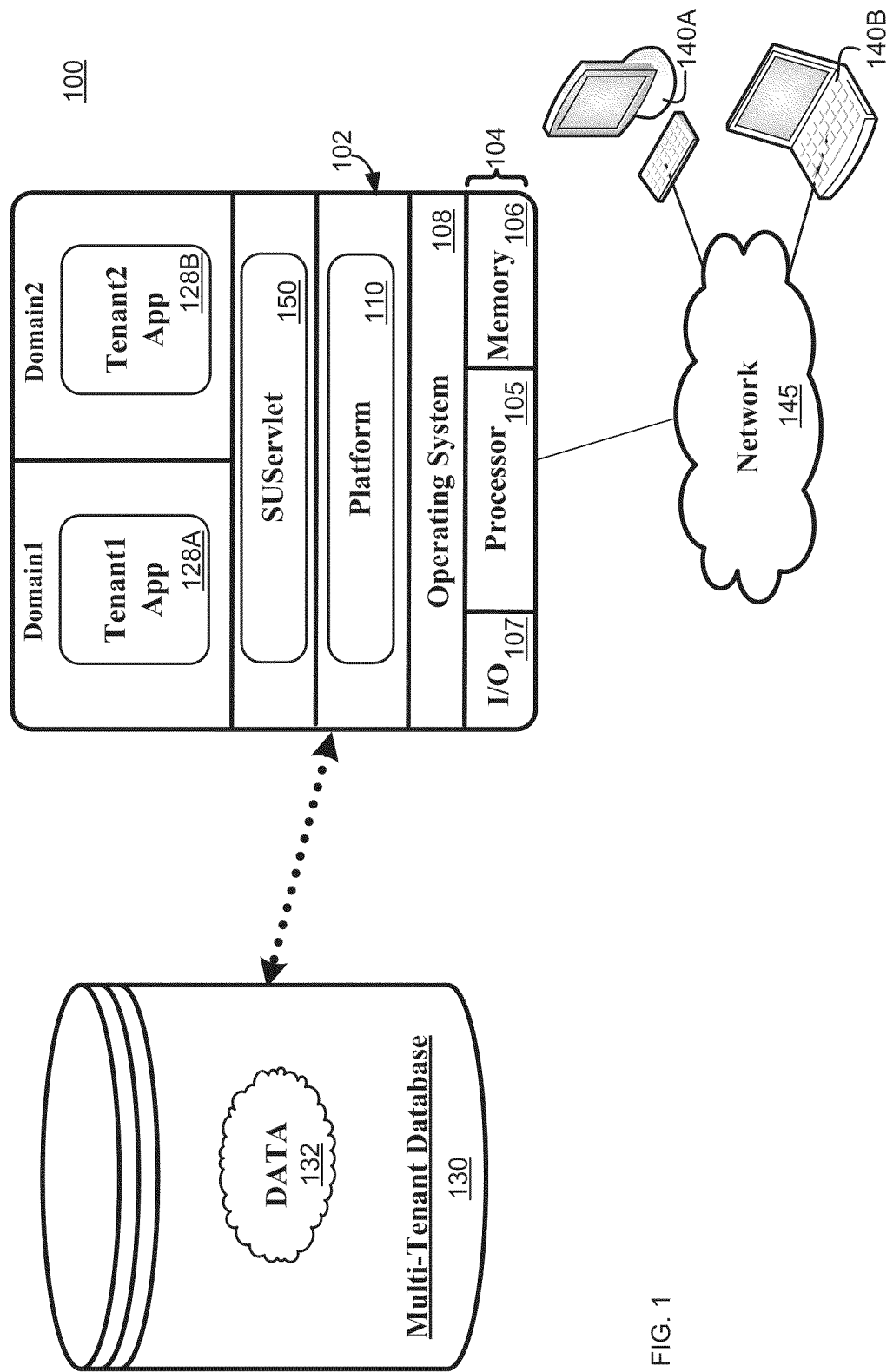

Turning now to FIG. 1, an exemplary multi-tenant application system 100 suitably includes a server 102 that dynamically creates virtual applications 128A-B based upon data 132 from a common database 130 that is shared between multiple tenants. Data and services generated by the virtual applications 128A-B are provided via network 145 to any number of client devices 140A-B, as desired. Each virtual application 128A-B is suitably generated at run-time using a common platform 110 that securely provides access to data 132 in database 130 for each of the various tenants subscribing to system 100. Each virtual application 128A-B may be accessible via a unique domain. For example, the virtual application 128A may be accessible on a first domain (e.g., http://www.companyname1.salesforce.com) and the application 128B may be accessible on a second domain (e.g., http://www.companyname2.com).

A "tenant" generally refers to a group of users that shares access to common data within database 130. Tenants may represent customers, customer departments, business or legal organizations, and/or any other entities that maintain data for particular sets of users within system 100. Although multiple tenants may share access to a common server 102 and database 130, the particular data and services provided from server 102 to each tenant can be securely isolated from those provided to other tenants. The multi-tenant architecture allows different sets of users to share functionality without necessarily sharing each other's data 132.

Database 130 is any sort of repository or other data storage system capable of storing and managing data 132 associated with any number of tenants. Database 130 may be implemented using any type of conventional database server hardware. In various embodiments, database 130 shares processing hardware 104 with server 102. In other embodiments, database 130 is implemented using separate physical and/or virtual database server hardware that communicates with server 102 to perform the various functions described herein.

Server 102 is implemented using one or more actual and/or virtual computing systems that collectively provide a dynamic application platform 110 for generating virtual applications 128A-B. Server 102 operates with any sort of conventional computing hardware 104, such as any processor 105, memory 106, input/output features 107 and the like. Processor 105 may be implemented using one or more of microprocessors, microcontrollers, processing cores and/or other computing resources spread across any number of distributed or integrated systems, including any number of "cloud-based" or other virtual systems. Memory 106 represents any non-transitory short or long term storage capable of storing programming instructions for execution on processor 105, including any sort of random access memory (RAM), read only memory (ROM), flash memory, magnetic or optical mass storage, and/or the like. Input/output features 107 represent conventional interfaces to networks (e.g., to network 145, or any other local area, wide area or other network), mass storage, display devices, data entry devices and/or the like. In a typical embodiment, application platform 110 gains access to processing resources, communications interfaces and other features of hardware 104 using any sort of conventional or proprietary operating system 108. As noted above, server 102 may be implemented using a cluster of actual and/or virtual servers operating in conjunction with each other, typically in association with conventional network communications, cluster management, load balancing and other features as appropriate.

When a user of, for example, client device 140A accessing virtual application 128A on Domain1, experiences an error, the user may contact an administrator of the server 102 for assistance. If the administrator were to log into the Domain1 as an administrator the administrator may not experience the same error as the user. Accordingly, the server 102 also includes a substitute user servlet ("SUServlet") 150 which allows the administrator to virtually become the user on the user's domain. Each domain may have its own SUServlet 150 to manage substitute user requests ("SU requests"). The SUServlet may, for example, be a Java servlet or the like. As discussed above, the server 102 may be implemented using a cluster of actual and/or virtual servers operating in conjunction with each other. Each of the actual and/or virtual servers may have a SUServlet 150 operating thereon. Each SUServlet may be in communication via the network 145 and may share, for example, encryption keys which may be used to verify substitute user ("SU") requests as discussed in further detail below.

Figure 2:
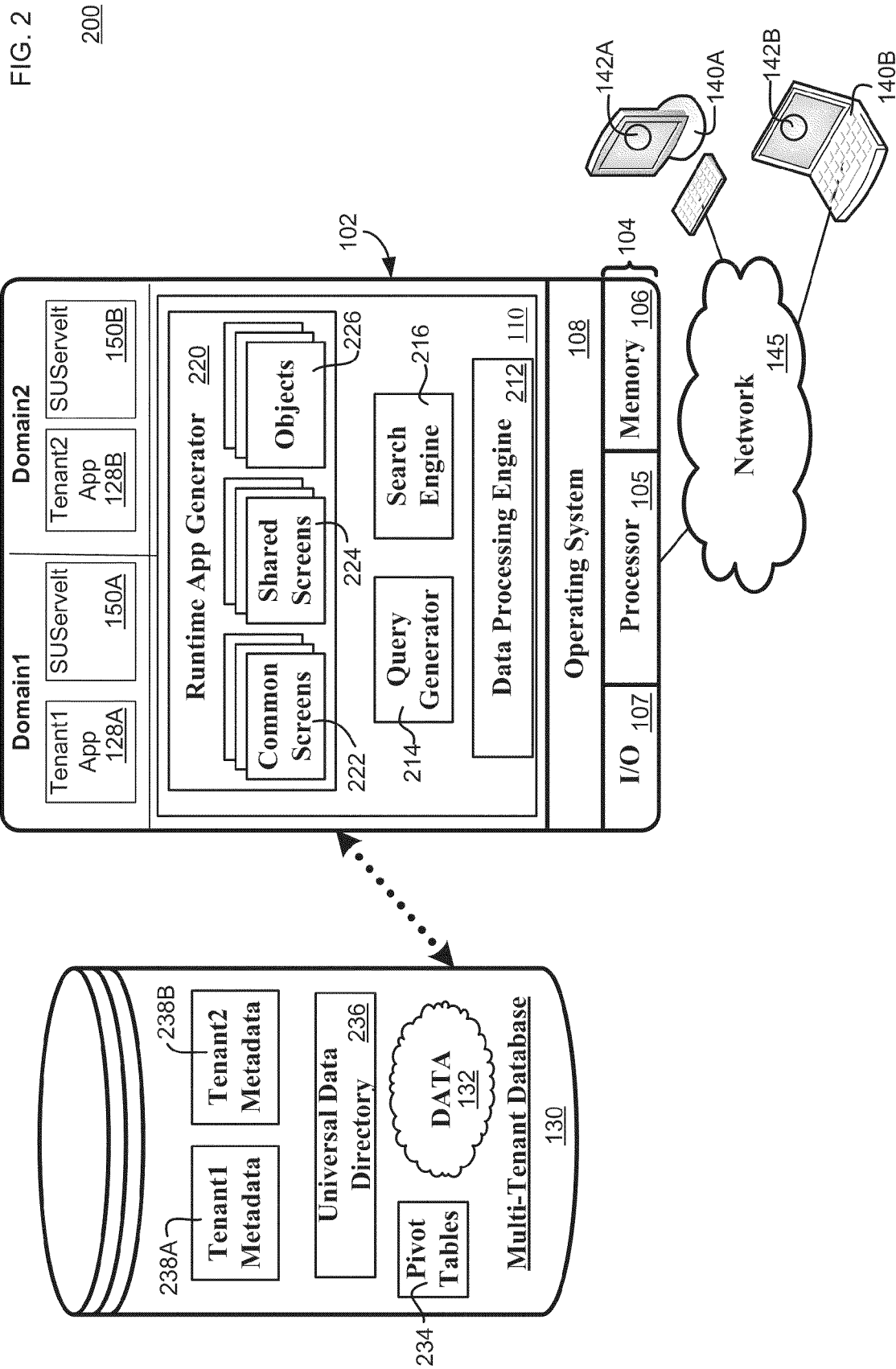
FIG. 2 is a block diagram of another exemplary multi-tenant data processing system.

FIG. 2 illustrates another exemplary multi-tenant application system 200 in accordance with an embodiment. The multi-tenant application system 200 includes client devices 140A-B and network 145 similar to those described above. The multi-tenant application system 200 further includes a server 102 that dynamically creates virtual applications 128A-B based upon data 132 from a common database 130 that is shared between multiple tenants. As discussed above, each virtual application 128A-B may be hosted on a separate domain. Further, each domain may have its own SUServelt 150A-B. Data and services generated by the virtual applications 128A-B are provided via network 145 to any number of client devices 140A-B, as desired. Each virtual application 128A-B is suitably generated at run-time using a common platform 110 that securely provides access to data 132 in database 130 for each of the various tenants subscribing to system 100.

Data 132 may be organized and formatted in any manner to support multi-tenant application platform 110. In various embodiments, data 132 is suitably organized into a relatively small number of large data tables to maintain a semi-amorphous "heap"-type format. Data 132 can then be organized as needed for a particular virtual application 128A-B. In various embodiments, conventional data relationships are established using any number of pivot tables 234 that establish indexing, uniqueness, relationships between entities, and/or other aspects of conventional database organization as desired.

Further data manipulation and report formatting is generally performed at run-time using a variety of meta-data constructs. Metadata within a universal data directory (UDD) 236, for example, can be used to describe any number of forms, reports, workflows, user access privileges, business logic and other constructs that are common to multiple tenants. Tenant-specific formatting, functions and other constructs may be maintained as tenant-specific metadata 238A-B for each tenant, as desired. Rather than forcing data 132 into an inflexible global structure that is common to all tenants and applications, then, database 130 is organized to be relatively amorphous, with tables 234 and metadata 236-238 providing additional structure on an as-needed basis. To that end, application platform 110 suitably uses tables 234 and/or metadata 236, 238 to generate "virtual" components of applications 128A-B to logically obtain, process, and present the relatively amorphous data 132 from database 130.

Application platform 110 is any sort of software application or other data processing engine that generates virtual applications 128A-B that provide data and/or services to client devices 140A-B. Virtual applications 128A-B are typically generated at run-time in response to queries received from client devices 140A-B. In the example illustrated in FIG. 2, application platform 110 includes a bulk data processing engine 212, a query generator 214, a search engine 216 that provides text indexing and other search functionality, and a runtime application generator 220. Each of these features may be implemented as a separate process or other module, and many equivalent embodiments could include different and/or additional features, components or other modules as desired.

Runtime application generator 220 dynamically builds and executes virtual applications 128A-B in response to specific requests received from client devices 140A-B. Virtual applications 128A-B created by tenants are typically constructed in accordance with tenant-specific metadata 238, which describes the particular tables, reports, interfaces and/or other features of the particular application. In various embodiments, each virtual application 128A-B generates dynamic web content that can be served to a browser or other client program 142A-B associated with client device 140A-B, as appropriate.

Application generator 220 suitably interacts with query generator 214 to efficiently obtain multi-tenant data 132 from database 130 as needed. In a typical embodiment, query generator 214 considers the identity of the user requesting a particular function, and then builds and executes queries to database 130 using system-wide metadata 236, tenant specific metadata 238, pivot tables 234 and/or any other available resources. Query generator 214 in this example therefore maintains security of the multi-tenant database 130 by ensuring that queries are consistent with access privileges granted to the user that initiated the request.

Data processing engine 212 performs bulk processing operations on data 132 such as uploads or downloads, updates, online transaction processing and/or the like. In many embodiments, less urgent bulk processing of data 132 can be scheduled to occur as processing resources become available, thereby giving priority to more urgent data processing by query generator 214, search engine 216, virtual applications 128A-B and/or the like. Again, the various components, modules and inter-relationships of other application platforms 120 may vary from the particular examples described herein.

In operation, then, developers use application platform 110 to create data-driven virtual applications 128A-B for the tenants that they support. Such applications 128A-B may make use of interface features such as tenant-specific screens 224, universal screens 222 or the like. Any number of tenant-specific and/or universal objects 226 may also be available for integration into tenant-developed applications 128A-B. Data 132 associated with each application 128A-B is provided to database 130, as appropriate, and stored until requested, along with metadata 138 that describes the particular features (e.g., reports, tables, functions, etc.) of tenant-specific application 128A-B until needed.

Data and services provided by server 102 can be retrieved using any sort of personal computer, mobile telephone, tablet or other network-enabled client device 140 on network 145. Typically, the user operates a conventional browser or other client program 242 to contact server 102 via network 145 using, for example, the hypertext transport protocol (HTTP) or the like. The user typically authenticates his or her identity to the server 102 to obtain a session identification ("SID") that identifies the user in subsequent communications with server 102. When the identified user requests access to a virtual application 128A-B, application generator 220 suitably creates the application at run time based upon metadata 236 and 238, as appropriate. Query generator 214 suitably obtains the requested data 132 from database 130 as needed to populate the tables, reports or other features of virtual application 128A-B. As noted above, the virtual application 128A-B may contain Java, ActiveX or other content that can be presented using conventional client software 142A-B running on client device 140A-B; other embodiments may simply provide dynamic web or other content that can be presented and viewed by the user, as desired.

Figure 3:
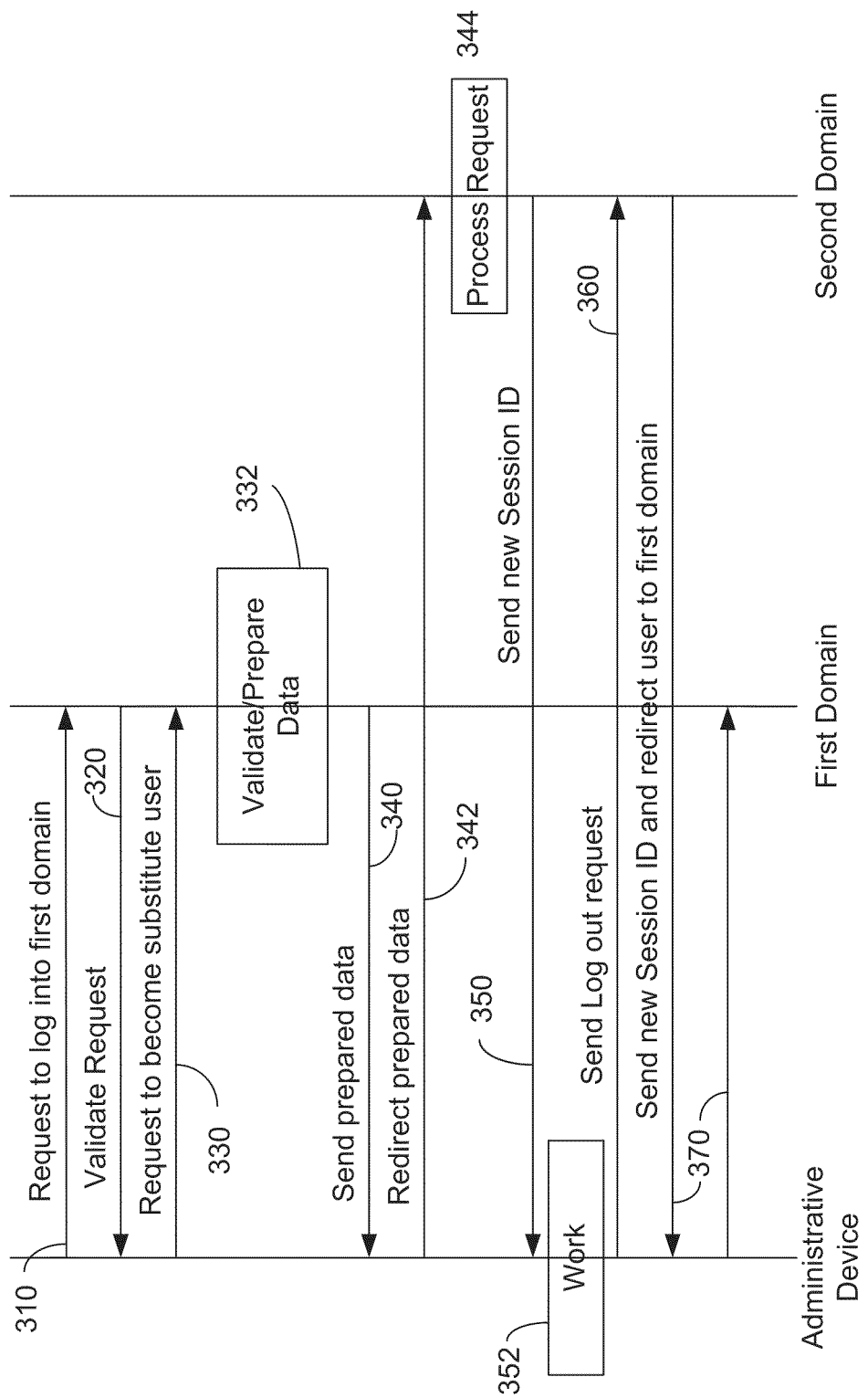
FIG. 3 is a flow chart illustrating an exemplary method for logging into a second domain from a first domain in a multi-tenant database system.

FIG. 3 illustrates a flow diagram 300 of an exemplary method for logging into a second domain from a first domain. An administrator on an administrative device first requests to log into a first domain. (Step 310). The administrative device may be, for example, one of client devices 140A-B. The first domain can be, for example, an administrative domain. The request to log into the first domain may be transmitted as a HTTP get request. An HTTP get request is a request to receive information from a server. The server associated with the first domain may validate the login request by verifying the identity of the administrator and return a session identification ("SID") to the administrative device. (Step 320). The SID may be stored on the administrative device, for example, as a cookie.

The administrator, from the administrative device, may then make a substitute user request ("SU request") to a SUServlet 150 on the first domain, requesting to become a substitute user for a user on a second domain. (Step 330). As discussed above, each domain one each actual and/or virtual server operating in conjunction with each other to form server 102 may have its own SUServlet 150 thereon. In another embodiment, the request may be redirected, via a HTTP redirect to a SUServlet 150 on another domain or server which may manage the SU request. An HTTP redirect causes a web browser on the administrative device to be redirected from a first location to a second location.

The SUServlet 150 then validates the SU request. (Step 332). In one embodiment, for example, the SUServlet 150 may verify the login information of the administrator to validate that the SU request came from an administrator of the server 102. If the SU request is validated, the SUServlet 150 then prepares the SU request by encrypting the administrators SID, IP address and domain information. (Step 334). In another embodiment, for example, the SUServlet also encrypts a timestamp, corresponding to when the SU request was prepared. The SU request, for example, can be configured to expire a predetermined period after the encrypted timestamp. In one embodiment, for example, a target user identification, identifying the user the administrator is attempting to become on the second domain, may also be encrypted to be included to the SU request. The data is encrypted so that the second domain can prevent man-in-the-middle style attacks by verifying the origin of the SU request, as discussed in further detail below.

The encrypted information and the SU request are then returned to the administrative device (Step 340). The administrative device may then send, for example by using a HTTP post, the prepared SU request (i.e., the SU request and the encrypted information) to the server associated with the second domain. (Step 342). In one embodiment, for example, the prepared SU request may be redirected from the administrative device using a HTTP redirect.

As discussed, the SUServlet 150 on the second domain validates the SU Request. (Step 344). The second domain may, for example, decrypt the encrypted IP address and compare the decrypted IP address with the IP address where the SU request originated. If the IP addresses do not match, the second domain may reject the SU request.

After the SU request is approved, the second domain then sends an HTTP post or put to the administrative device including a new SID which allows the administrator to access the second domain as the target user. (Step 350). The new SID may be saved, for example, as a cookie on the administrative device. In one embodiment, for example, a regular session identification ("RSID") or other additional data can also be sent back to the administrative device via the HTTP post. In an ordinary login, the SID cookie stores the user's session id which determines the identify of the logged in user. When the administrator logs in as a second user, the SID is overwritten to be that of the user the administrator is "impersonating." The RSID can be used to identify that this is an impersonation login and not the actual user. In one embodiment, for example, the RSID can identify that user of the second domain as the administrator, allowing the administrator access to everything related to the targeted user, but preventing the administrator from modifying any of the targeted user's data.

Once the administrative device receives the new SID, the administrator can access an application or other element on the second domain as if they were the target user. As discussed above, the administrator may perform, for example, diagnostic work or debugging work. (Step 352).

When the administrator requests to log out of the session on the second domain (Step 360) the server running the second domain clears the administrators SID and RSID and sends a new SID to the administrators device allowing the administrative device to be redirected back the first domain. (Step 370). The new SID can, for example, be the same SID which was encrypted in Step 332.

Generally speaking, the various functions and features of method 300 may be carried out with any sort of hardware, software and/or firmware logic that is stored and/or executed on any platform. Some or all of method 300 may be carried out, for example, by logic executing within system 100 in FIG. 1. For example, various functions shown in FIG. 3 may be implemented using software or firmware logic that is stored in memory 106 and executed by processor 105 as part of application platform 110. The particular hardware, software and/or firmware logic that implements any of the various functions shown in FIG. 3, however, may vary from context to context, implementation to implementation, and embodiment to embodiment in accordance with the various features, structures and environments set forth herein. The particular means used to implement each of the various functions shown in FIG. 3, then, could be any sort of processing structures that are capable of executing software and/or firmware logic in any format, and/or any sort of application-specific or general purpose hardware, including any sort of discrete and/or integrated circuitry.

The term "exemplary" is used herein to represent one example, instance or illustration that may have any number of alternates. Any implementation described herein as "exemplary" should not necessarily be construed as preferred or advantageous over other implementations.

Although several exemplary embodiments have been presented in the foregoing description, it should be appreciated that a vast number of alternate but equivalent variations exist, and the examples presented herein are not intended to limit the scope, applicability, or configuration of the invention in any way. To the contrary, various changes may be made in the function and arrangement of the various features described herein without departing from the scope of the claims and their legal equivalents.

What is claimed is:

1. A method for logging into an application across separate domains, comprising:
sending, by an administrative device, a request by an administrative user to log in to a server associated with a first domain in a database system environment;
receiving, by the administrative device, a session identification allowing the administrative user to log into the server associated with the first domain in the database system environment;
sending, by the administrative device, a substitute user request to the server associated with the first domain in the database system environment, the substitute user request including a request for the administrative user of the administrative device to become associated with another user's profile on a second domain in the database system environment, wherein the other user's profile on the second domain is a non-administrative user on the second domain;
receiving, by the administrative device, prepared data allowing the user of the administrative device to directly login to an application of the database system environment on the second domain as if the administrative user was the non-administrative user, the prepared data including an encrypted version of the IP address of the administrative device;
sending, by the administrative device, the prepared data to a second server associated with the second domain with an IP address of the administrative device;
receiving, from the second server, a session ID allowing the user of the administrative device to directly login to the application on the second domain as the non-administrative user when the second server determines that the encrypted version of the IP address of the administrative device included within the prepared data matches the IP address sent with the prepared data;
sending, by the administrative device, a request to log out of the application to the second server, the second server clearing the session ID upon receipt of the request to log out of the application; and
receiving, by the administrative device from the second server, a previous session identification to the user of the first domain redirecting the user of the first domain back to the first domain.

2. The method of claim 1, wherein prepared data further includes an encrypted session identification and an encrypted target user identification, the target user identification corresponding to a user of the second domain.

3. The method of claim 1, further comprising:
sending, by the administrative device, a request to log out of the application on the second domain; and
receiving, by the administrative device, a new session identification allowing the user to return to the first domain.

4. A system for logging into an application across separate domains in database system environment, comprising:
a first server having a first processor and a first memory, associated with a first domain; and
a second server having a second processor and a second memory, associated with a second domain, the second server hosting an application on the second domain, wherein the first server is configured to:
receive a substitute user request from an administrative device associated with a administrative user of the first domain, the substitute user request including a request for the administrative user of the first domain to become associated with another user's profile on a second domain;
prepare data allowing the administrative user of the first domain to login to the application on the second domain as if the administrative user is the user associated with the other user's profile, the prepared data including an encrypted version of the IP address of the administrative device;
send the prepared data to the administrative device associated with the administrative user of the first domain; and
redirect the administrative device to a second server associated with the second domain allowing the administrative device associated with the administrative user of the first domain to post the prepared data along with the IP address of the administrative device to the second domain and allowing the administrative user to access the second domain as if the administrative user is the user associated with the other user's profile when the second server determines that the encrypted version of the IP address of the administrative device included within the prepared data matches the IP address posted with the prepared data;
wherein second server is further configured to:
receive the prepared data from the user of the first domain:
validate the received prepared data;
send, if the prepared date is validated, a new session identification to the user of the first domain allowing the user of the first domain to login to the application on the second domain;
receive a request to log out of the application from a user of the first domain;
clear the new session ID identification upon receiving the request to log out of the application; and
send, after receiving the request to log out of the application, a previous session identification to the user of the first domain redirecting the user of the first domain back to the first domain.

5. The system of claim 4, wherein the first server and the second server each include a servlet to manage the substitute user request.

6. The system of claim 4, wherein the prepared data further includes an encrypted session identification of the user of the first domain and a target user identification.

7. The system of claim 4, wherein session identification is sent using a HTTP put instruction.

8. The system of claim 4, wherein the new session identification limits the user of the first domain from modifying application data on the second domain.

9. A method for logging into a second domain of a database system from a first domain of the database system, comprising:
receiving, by a server associated with the first domain of the database system, a request from an administrative user of a first device to log onto the second domain as if the administrative user was associated with another user's profile on the second domain;
preparing, by the server associated with the first domain of the database system, data allowing the administrative user of the first device to login to an application of the second domain of the database system as if the administrative user was associated with the other user's profile on the second domain the prepared data including an encrypted version of the IP address of the first device; and sending, by the server associated with the first domain in the database system, the prepared data to the first device associated with the administrative user of the first domain in the database system and redirecting the administrative device to a second server associated with the second domain in the database system to thereby allow the administrative user of the first domain to post the prepared data along with the IP address of the first device to the second domain and allowing the administrative user to access the second domain as if the administrative user was associated with another user's profile on the second domain when the second server determines that the encrypted version of the IP address of the administrative device included within the prepared data matches the IP address sent with the prepared data;

receiving, by a server associated with the second domain, the prepared data from the user of the first domain;

validating, by a server associated with the second domain, the received prepared data: and sending, by a server associated with the second domain, a new session identification, if the prepared date is validated, to the user of the first domain allowing the user of the first domain to login to the application on the second domain;

sending, by the administrative device, a request to log out of the application of the second domain to the second server, the second server clearing the new session identification upon receipt of the request to log out of the application; and receiving, by the administrative device from the second server, a previous session identification to the user of the first domain redirecting the user of the first domain back to the first domain.

10. The method of claim 9, wherein the new session identification is sent using a HTTP put instruction.

11. The method of claim 9, wherein the first domain is an administrative domain.

12. The method of claim 9, wherein the new session identification limits the user of the first domain from modifying data on the second domain.

* * * * *